(12) United States Patent
Louderback et al.

(10) Patent No.: US 10,958,348 B2
(45) Date of Patent: Mar. 23, 2021

(54) METHOD FOR MANUFACTURING MODULAR MULTI-FUNCTION ACTIVE OPTICAL CABLES

(71) Applicant: Zephyr Photonics Inc., Zephyr Cove, NV (US)

(72) Inventors: Duane Louderback, Zephyr Cove, NV (US); Kjersti Anna Kleven, Lynchburg, VA (US); Tyler Joe Eustis, Carson City, NV (US); Mitchell Thomas Harris, Verdi, NV (US)

(73) Assignee: ZEPHYR PHOTONICS INC., Zephyr Cove, NV (US)

( * ) Notice: Subject to any disclaimer, the term of this patent is extended or adjusted under 35 U.S.C. 154(b) by 1083 days.

(21) Appl. No.: 14/135,020

(22) Filed: Dec. 19, 2013

(65) Prior Publication Data
US 2014/0182124 A1     Jul. 3, 2014

Related U.S. Application Data

(60) Provisional application No. 61/747,349, filed on Dec. 30, 2012, provisional application No. 61/747,295, filed on Dec. 29, 2012.

(51) Int. Cl.
*H04B 10/2581* (2013.01)
*G02B 6/44* (2006.01)
(Continued)

(52) U.S. Cl.
CPC ....... *H04B 10/2581* (2013.01); *G02B 6/4293* (2013.01); *G02B 6/4416* (2013.01);
(Continued)

(58) Field of Classification Search
CPC ...... H01B 11/22; H02G 1/14; H04B 10/2581; G02B 6/4293; G02B 6/4416; Y10T 29/49117
See application file for complete search history.

(56) References Cited

U.S. PATENT DOCUMENTS 4,732,446 A    3/1988   Gipson
4,767,168 A    8/1988   Grandy
(Continued)

FOREIGN PATENT DOCUMENTS

| EP | 2253980 | 11/2010 |
| EP | 2645638 | 10/2013 |
| WO | 2006029299 | 3/2006 |

OTHER PUBLICATIONS

Dutton, Harry J.R., "Understanding Optical Communications," IBM, International Technical Support Organization, Retrieved from http://www.redbooks.ibm.com, 638 pages.
(Continued)

*Primary Examiner* — Peter Dungba Vo
*Assistant Examiner* — Jeffrey T Carley
(74) *Attorney, Agent, or Firm* — Pillsbury Winthrop Shaw Pittman LLP (57) ABSTRACT

A method of making modular multi-function active optical cables (AOC) that enables multiple functions with minimal non-recurring engineering is described herein. In a non-limiting embodiment, one or more modular boards may be assembled into an assembly at a first end and a second end of the modular multi-function active optical cable, where each modular board may include at least a first connector. An electrical connector may be connected to the assembly using an interface to connect the electrical connector to the first connector associated with each module board. A hybrid cable assembly then may be connected between the assembly at the first end and the second, where the hybrid cable assembly includes one or more optical fibers and one or more electrical conductors.

57 Claims, 6 Drawing Sheets

(51) Int. Cl.
  *G02B 6/42* (2006.01)
  *H04B 10/077* (2013.01)
  *G02B 6/38* (2006.01)
(52) U.S. Cl.
  CPC ......... *H04B 10/077* (2013.01); *G02B 6/3817* (2013.01); *G02B 6/3885* (2013.01); *G02B 6/4269* (2013.01); *G02B 6/4471* (2013.01); *Y10T 29/49117* (2015.01)

(56) References Cited

U.S. PATENT DOCUMENTS

| | | | |
|---|---|---|---|
| 4,811,361 A | 3/1989 | Bacou et al. | |
| 4,895,426 A | 1/1990 | Pinson | |
| 4,930,049 A | 5/1990 | Davenport et al. | |
| 4,952,012 A * | 8/1990 | Stamnitz | G02B 6/4416 385/101 |
| 5,212,750 A | 5/1993 | Wright | |
| 5,394,503 A * | 2/1995 | Dietz, Jr. | G02B 6/3895 385/134 |
| 5,672,548 A | 9/1997 | Culnane | |
| 5,719,977 A | 2/1998 | Lampert | |
| 5,771,114 A | 6/1998 | Andersson et al. | |
| 5,844,236 A | 12/1998 | Wilson | |
| 5,848,212 A | 12/1998 | Wagman | |
| 5,879,173 A * | 3/1999 | Poplawski | G02B 6/4246 439/138 |
| 6,052,248 A | 4/2000 | Reed et al. | |
| 6,052,632 A | 4/2000 | Iihoshi et al. | |
| 6,222,976 B1 | 4/2001 | Shahid | |
| 6,257,771 B1 | 7/2001 | Okayasu | |
| 6,351,590 B1 | 2/2002 | Shahid | |
| 6,519,395 B1 | 2/2003 | Bevan et al. | |
| 6,631,490 B2 | 10/2003 | Shimoda | |
| 6,694,083 B2 | 2/2004 | Paradiso et al. | |
| 6,767,141 B1 * | 7/2004 | Dudek | G02B 6/4292 385/53 |
| 6,795,947 B1 | 9/2004 | Siegel et al. | |
| 6,978,319 B1 | 12/2005 | Rostoker et al. | |
| 6,989,776 B2 | 1/2006 | Tsang | |
| 7,000,177 B1 | 2/2006 | Wu et al. | |
| 7,030,789 B1 | 4/2006 | Cideciyan et al. | |
| 7,044,656 B1 | 5/2006 | Hofmeister et al. | |
| 7,071,851 B1 | 7/2006 | Blaum et al. | |
| 7,103,830 B1 | 9/2006 | Dong | |
| 7,120,778 B2 | 10/2006 | Zimmer | |
| 7,174,485 B2 | 2/2007 | Silvus | |
| 7,290,184 B2 | 10/2007 | Bruner et al. | |
| 7,307,556 B2 | 12/2007 | Lee | |
| 7,362,936 B2 | 4/2008 | Stark et al. | |
| 7,409,622 B1 | 8/2008 | Lu et al. | |
| 7,515,619 B2 | 4/2009 | Juluri | |
| 7,515,797 B2 | 4/2009 | Stark et al. | |
| 7,515,798 B2 | 4/2009 | Stark et al. | |
| 7,714,748 B1 | 5/2010 | Chaichanavong | |
| 7,949,025 B2 | 5/2011 | Olea | |
| 7,962,827 B2 | 6/2011 | Tang et al. | |
| 8,049,648 B2 | 11/2011 | Chaichanavong | |
| 8,055,977 B2 | 11/2011 | Ito | |
| 8,069,391 B1 | 11/2011 | Wu et al. | |
| 8,151,162 B2 | 4/2012 | Kanaoka et al. | |
| 8,161,347 B1 | 4/2012 | Kou | |
| 8,225,148 B2 | 7/2012 | Tang et al. | |
| 8,904,258 B2 | 12/2014 | Stark | |
| 9,020,344 B2 | 4/2015 | Stark | |
| 2002/0028048 A1 * | 3/2002 | Dair | G02B 6/4214 385/92 |
| 2002/0136510 A1 | 9/2002 | Heinz | |
| 2002/0165962 A1 | 11/2002 | Alvarez | |
| 2003/0093519 A1 * | 5/2003 | Jackson | G05B 19/0423 709/224 |
| 2004/0047637 A1 | 3/2004 | Wang | |
| 2004/0134662 A1 | 7/2004 | Chitwood | |
| 2004/0175077 A1 | 9/2004 | Weber | |
| 2005/0248454 A1 | 11/2005 | Hanson | |
| 2005/0259571 A1 | 11/2005 | Battou | |
| 2006/0140564 A1 | 6/2006 | Upton | |
| 2006/0159462 A1 | 7/2006 | Aronson et al. | |
| 2006/0230425 A1 | 10/2006 | Shani et al. | |
| 2006/0291784 A1 | 12/2006 | Wang | |
| 2007/0086720 A1 | 4/2007 | Morris | |
| 2007/0105452 A1 | 5/2007 | Gerlach | |
| 2007/0206906 A1 * | 9/2007 | Stark | G02B 6/4284 385/89 |
| 2007/0238360 A1 * | 10/2007 | Khemakhem | H01R 13/6658 439/620.03 |
| 2008/0260386 A1 * | 10/2008 | Boduch | H04J 14/0204 398/83 |
| 2008/0299818 A1 * | 12/2008 | Hughes | H01R 13/53 439/445 |
| 2009/0068858 A1 | 3/2009 | Di Stefano | |
| 2009/0070439 A1 | 3/2009 | Wei | |
| 2009/0135868 A1 | 5/2009 | Ishibashi | |
| 2009/0285536 A1 * | 11/2009 | Sakaki | G02B 6/3874 385/92 |
| 2010/0061726 A1 | 3/2010 | Barbarossa et al. | |
| 2010/0150573 A1 * | 6/2010 | Furuyama | G02B 6/3895 398/142 |
| 2010/0258333 A1 * | 10/2010 | Horan | H01B 11/1091 174/78 |
| 2011/0110631 A1 * | 5/2011 | Baker | G02B 6/4284 385/88 |
| 2011/0200286 A1 * | 8/2011 | Smith | G02B 6/3817 385/86 |
| 2011/0291578 A1 | 12/2011 | Philippbar et al. | |
| 2012/0207427 A1 | 8/2012 | Ito | |
| 2012/0276778 A1 | 11/2012 | Figie | |
| 2013/0287349 A1 | 10/2013 | Faulkner | |
| 2014/0186023 A1 | 7/2014 | Louderback | |
| 2015/0180578 A1 * | 6/2015 | Leigh | G02B 6/4293 398/135 |

OTHER PUBLICATIONS

Papadimitriou, G.I., et al., "Optical Switching: Switch Fabrics, Techniques, and Architectures," Journal of Lightwave Technology, 21(2), 384-405, Feb. 2003.
Popplewell et al., "Peformance Aspects of Error Correcting Line Codes," Second IEEE National Conference on Telecommunications, pp. 47-52, 1989.
Small, B.A., et al., "The Current and Future State of Optical Switching Technologies as Related to the Data Vortex Photonic Switching Architecture," 6 pages.
Yang, Q. et al., "New Switch Fabric Architecture for Bursty Traffic," IEEE, 43-44, 2002.
PCT International Application No. PCT/US2014/044405— International Search Report dated Nov. 14, 2014. 4 pages.

* cited by examiner

METHOD FOR MANUFACTURING MODULAR MULTI-FUNCTION ACTIVE OPTICAL CABLES

CROSS REFERENCE TO RELATED APPLICATIONS

This application claims the benefit of U.S. Provisional Application Ser. No. 61/747,295 entitled "Apparatus for Modular Implementation of Multi-Function Active Optical Cables" filed Dec. 29, 2012 and U.S. Provisional Application Ser. No. 61/747,349 entitled "Method and Apparatus for Modular Design, Manufacturing and Implementation of Multi-Function Active Optical Cables" filed Dec. 30, 2012. Both of the above-referenced provisional applications are hereby incorporated herein by reference in their entireties.

BACKGROUND OF THE INVENTION

This invention relates to the design and/or manufacturing of active optical cables, particularly for aerospace, military, and/or industrial applications in harsh environments.

Most interconnects in harsh environments, particularly for aerospace, military, and/or industrial applications, may be implemented using electrical cables. Using electrical cables has significant advantages, including: the ability to use ruggedized, blind-mateable electrical connectors such as the MIL-DTL-38999, flexibility in integrating different types of data, the ability to distribute electrical power, and/or the ability to operate in harsh environments including those with extended temperature ranges and/or high levels of contamination. However, the use of electrical cables for these interconnects also has disadvantages, including: susceptibility to electromagnetic interference, large cable size and/or weight, and/or limited ability to upgrade to higher bandwidths and/or longer transmission distances.

In principle, optical data transmission may address these disadvantages, but existing optical interconnect solutions have fallen drastically short of providing a viable solution to interconnects in these applications and/or environments.

Existing optical solutions only enable the transmission of a single type (namely, electrical format) of data and may not include the ability to distribute electrical power and/or perform significant health monitoring functions. Such solutions may be also standardized to a specific electrical connector and/or pin-out. The standardization may be done to create standard products with sufficient manufacturing volume to make them profitable.

Much of the interconnect market in these applications includes a wide variety of customized cabling including different connectors, pin-outs, power distribution requirements, and/or types of electrical data. In addition, the electrical data often consists of multiple channels of different types of data, usually requiring media conversion before the electrical data may be used for optical data transmission. Another challenge may be the small volumes typically associated with these applications. Overall the potential market for optical solutions in aerospace, military, and/or industrial applications may be substantial, but the potential market may be comprised of a very large number of customized cables, each with only a small volume.

Although optical interconnects may be incorporated in limited situations in applications such as aerospace, military, and/or industrial markets, these applications tend to be for high-bandwidth interconnects where only a single standardized type of data may be present. While a much larger section of the interconnect market in these applications may greatly benefit from some of the inherent advantages of optical interconnects, they require solutions that may be drastically different from existing products in both form and/or function. The lack of a modular design and/or manufacturing method that scales to small volumes limits the ability to provide the required optical interconnect solution for many of these applications.

SUMMARY OF THE INVENTION

To this end, in an embodiment of the invention, a method of making modular multi-function active optical cables is provided. The method may have the steps of: ruggedizing an electrical connector at each end of the active optical cable; providing one or more board connectors; providing an interface between the ruggedized electrical connector and/or the board connectors; providing one or more modular boards; providing a mechanical assembly for the modular boards; providing a hybrid cable assembly having one or more optical fibers, zero or more electrical conductors, connectors for the optical fibers and/or conductor terminations for electrical connection; and/or providing an enclosure for the modular boards.

In an embodiment, the method may have the step of accommodating a variety of the ruggedized electrical connector types without changing the modular boards.

In an embodiment, the ruggedized electrical connector may be a MIL-DTL-38999.

In an embodiment, the ruggedized electrical connector may be a D-sub type connector.

In an embodiment, the method may have the step of accommodating a variety of pin arrangements without changing the modular boards.

In an embodiment, the method may have the step of accommodating a variety of connector sizes without changing the modular boards.

In an embodiment, the method may have the step of accommodating a variety of pin-outs without changing the modular boards.

In an embodiment, the method may have the step of accommodating a variety of the board connector types to accommodate different modular board requirements.

In an embodiment, the method may have the step of using one or more fixed board connector types for a specific modular board.

In an embodiment, the board connector may be one or more of the following: a D-sub type connector, a nanominiature type connector, flex circuit, cable-to-board connector, surface mount connector, a direct solder connection, and/or coaxial connections.

In an embodiment, the method may have the step of changing the interface between the ruggedized electrical connector and the board connectors with minimal design and/or manufacturing effort to accommodate different pin-outs in the ruggedized connector.

In an embodiment, the method may have the step of press fitting a board to the pins of the ruggedized electrical connector in the interface between the ruggedized electrical connector and the board connectors.

In an embodiment, the method may have the step of soldering a board to the pins of the ruggedized electrical connector in the interface between the ruggedized electrical connector and the board connectors.

In an embodiment, the method may have the step of surface mounting connectors for the modular boards to the board that press fits to the pins of the ruggedized electrical connector.

In an embodiment, the method may have the step of surface mounting connectors for the modular boards to the board that solders to the pins of the ruggedized electrical connector.

In an embodiment, the method may have the step of connecting the board to the board connectors with a flex circuit.

In an embodiment, the method may have the step of providing a flex circuit in the interface between the ruggedized electrical connector and the board connectors.

In an embodiment, the method may have the step of providing power connections between the modular boards without being connected to a pin on the ruggedized electrical connector in the interface between the ruggedized electrical connector and the board connectors.

In an embodiment, the method may have the step of providing ground connections between the modular boards without being connected to a pin on the ruggedized electrical connector in the interface between the ruggedized electrical connector and the board connectors.

In an embodiment, the method may have the step of providing interconnections between the modular boards without being connected to a pin on the ruggedized electrical connector in the interface between the ruggedized electrical connector and the board connectors.

In an embodiment, the method may have the step of providing microcontroller communication between the modular boards without being connected to pins on the ruggedized electrical connector in the interface between the ruggedized electrical connector and the board connectors.

In an embodiment, the method may have the step of connecting the ruggedized electrical connector to frame ground.

In an embodiment, the method may have the step of separating power and/or ground connections from other signal connections in the interface between the ruggedized electrical connector and the board connectors.

In an embodiment, the method may have the step of enabling the modular boards to be used in different combinations to implement different active optical cable requirements.

In an embodiment, the method may have the step of providing a fixed interface both optically and/or electrically to the hybrid cable assembly for a specific modular board.

In an embodiment, the method may have the step of providing a fixed interface electrically to the hybrid cable assembly for a specific modular board.

In an embodiment, the method may have the step of implementing subsets of the total functionality required by the multi-function active optical cables.

In an embodiment, the method may have the step of communicating between the modular boards.

In an embodiment, the method may have the step of implementing the communication between the modular boards using microcontrollers.

In an embodiment, one of the microcontrollers may be the master microcontroller and/or the other microcontrollers may be slaves.

In an embodiment, the method may have the step of communicating from one or more of the modular boards over the hybrid cable assembly to one or more of the modular boards on the other end of the active optical cable.

In an embodiment, the method may have the step of implementing power management functions by one of the modular boards for other modular boards.

In an embodiment, the power management may include power distribution over the hybrid cable assembly.

In an embodiment, the power management may encompass surge protection, power isolation, voltage regulation, and/or noise filtering.

In an embodiment, the method may have the step of providing one of the modular boards to be a mother board that implements common functions for other modular boards.

In an embodiment, the common functions may have communication outside the active optical cable.

In an embodiment, the method may have the step of implementing the communication outside the active optical cable using a two wire interface, three wire interface, I2C, SPI, and/or interfaces that may require more wires such as Ethernet and/or RS-422.

In an embodiment, the method may have the step of implementing the communication with the other end of the active optical cable optically or electrically.

In an embodiment, the common functions may encompass one or more of the following: built-in test, health monitoring, status reporting, communication with the other end of the active optical cable, providing an interface for field maintenance, providing an interface for firmware upgrades, and/or an interface for communicating with upstream components and/or systems.

In an embodiment, the method may have the step of implementing other functions that may not be common functions with the mother board.

In an embodiment, the method may have the step of implementing the interface for one or more electrical data types with the modular boards; and converting the incoming/outgoing electrical data to/from optical data for transmission over the hybrid cable assembly.

In an embodiment, the method may have the step of providing more than one channel of a specific electrical data type.

In an embodiment, the method may have the step of accommodating at least one of the following in the interface for electrical data types: RS-485, RS-422, RS-232, MIL-STD-1553, ARINC-429, CAN Bus, transistor-transistor logic (TTL) type data, CMOS type data, pulse width modulated (PWM) type data, interlock type data, 10/100/1000 Base-T Ethernet, analog video data, SDI video, Camera-Link, FireWire, USB, high-speed differential signal data, and/or DVI video data.

In an embodiment, the method may have the step of using health monitoring to enable optical data to be rolled over to an alternative optical channel if the primary optical channel degrades and/or fails.

In an embodiment, the method may have the step of enabling a specific modular board to be used in an active optical cable even though not all functions implemented on the modular board may be required.

In an embodiment, the method may have the step of enabling the modular boards to be manufactured in higher volumes than would be possible if custom boards were designed and/or manufactured for each customer requirement.

In an embodiment, the method may have the step of performing verification and/or qualification of the modular boards once and applying the verification and/or qualification to different active optical cables.

In an embodiment, the method may have the step of providing heat sinks for the mechanical assembly for the modular boards.

In an embodiment, the method may have the step of providing mechanical support for mechanical shock and/or vibration for the mechanical assembly for the modular boards.

In an embodiment, the heat sinks may be made of copper, aluminum, stainless steel, or other metal.

In an embodiment, the method may have the step of attaching the heat sinks to the modular boards using a compliant material to compensate for differences in coefficient of thermal expansion (CTE).

In an embodiment, the compliant material may be thermal grease.

In an embodiment, the method may have the step of attaching the heat sinks to the modular boards and/or specific components on a modular board using thermally conductive epoxy.

In an embodiment, the method may have the step of filling the enclosure and space between modular boards with a thermally conductive foam or injection molded material. In an embodiment, the method may have the step of bolting the mechanical assembly together.

In an embodiment, the method may have the step of connecting the heat sinks to frame ground.

In an embodiment, the method may have the step of attaching the heat sinks to the front and/or back sides of the modular boards.

In an embodiment, the method may have the step of using a common set of firmware with a configuration file to specify the functions present in that specific active optical cable.

In an embodiment, the method may have the step of using a common set of test equipment and/or procedures with a configuration file to specify the functions present in that specific active optical cable.

In an embodiment, the method may have the step of providing the modular hybrid cable assemblies to meet the requirements of multiple users.

In an embodiment, the method may have the step of providing the modular hybrid cable assemblies with optical fibers that may not be used by all users.

In an embodiment, the method may have the step of providing the modular hybrid cable assemblies with conductors that may not be used by all users.

In an embodiment, the method may have the step of providing the hybrid cable assemblies to support the distribution of power at different voltages, currents, and/or distances.

In an embodiment, the method may have the step of terminating the optical fibers of the hybrid cable assembly in MT type connectors.

In an embodiment, the method may have the step of terminating the optical fibers of the hybrid cable assembly in MT ferrules.

In an embodiment, the method may have the step of terminating the optical fibers of the hybrid cable assembly in LC ferrules.

In an embodiment, the method may have the step of shielding the conductors in the hybrid cable assembly with a grounded conductive sheath or other grounded shield.

In an embodiment, the method may have the step of ruggedizing the hybrid cable assembly with a strength member.

In an embodiment, the method may have the step of using the strength member for strain relief when attaching the hybrid cable assembly to the modular boards, frame for mounting the modular boards, and/or the ruggedized electrical connector.

In an embodiment, the method may have the step of providing jacketing material to the hybrid cable assembly to provide environmental ruggedization.

In an embodiment, the method may have the step of mechanically connecting the modular boards to the ruggedized electrical connector and/or the hybrid cable assembly with the enclosure for the modular boards and/or the frame for mounting the modular boards.

In an embodiment, the method may have the step of providing environmental sealing with the enclosure for the modular boards.

In an embodiment, the method may have the step of providing mechanical ruggedization with the enclosure for the modular boards.

In an embodiment, the method may have the step of providing strain relief for the hybrid cable assembly with the enclosure for the modular boards and/or the frame for mounting the modular boards.

In an embodiment, the method may have the step of providing electromagnetic interference (EMI) shielding with the enclosure for the modular boards.

In an embodiment, the method may have the step of connecting the enclosure for the modular boards to frame ground.

In an embodiment, the enclosure may have a backshell.

In an embodiment, the backshell may be metal.

In an embodiment, the enclosure may comprise overmolding.

In an embodiment, the overmolding may encompass low-pressure injection molding and/or high-pressure injection molding.

In an embodiment, the enclosure may have a backshell and/or overmolding.

In an embodiment, the method may have the step of enabling the enclosure to be used for a variety of combinations of the modular boards.

In an embodiment, the method may have the step of enabling the enclosure to be used with different numbers of the modular boards.

In an embodiment, the method may have the step of enabling straight, right-angle and/or arbitrary-angle connections with only a change in the design and/or manufacturing of the enclosure and/or connectors to the ruggedized electrical connector.

DETAILED DESCRIPTION OF THE INVENTION

A method for the modular design and/or manufacturing of multi-function active optical cables utilizes modular functional parts including ruggedized connectors, optoelectronic interface boards, and/or hybrid cable assemblies. By using the design and/or manufacturing method disclosed, the interchangeable parts may be combined in a large number of combinations to enable a wide variety of multi-function active optical cables that require limited design and/or qualification, enabling customized active optical cables to be manufactured profitably at small production volumes.

Figure 1:
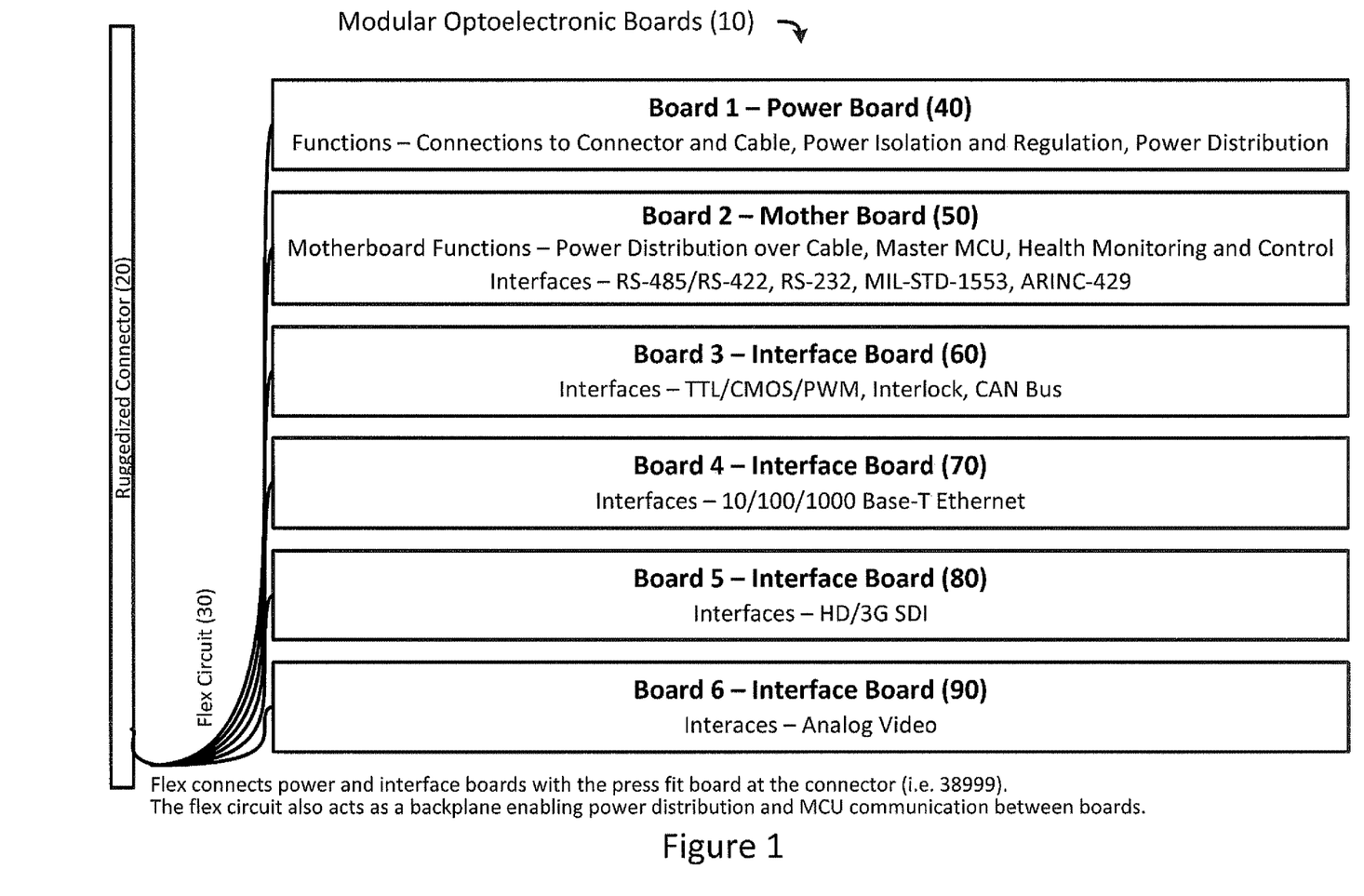
FIG. 1 is a schematic diagram of multiple standardized boards connected to a ruggedized connector by a flexible cable with multiple board connectors in accordance with embodiments disclosed herein. The standardized boards may implement a variety of functions as shown, including: power management, mother board functions, and/or data conversion and/or transmission for a variety of different types of electrical data.

FIG. 1 illustrates the use of a plurality of modular optoelectronic boards 10 useful in embodiments disclosed herein. The standardized boards 10 may implement a variety of functions as shown, including: power management, mother board functions, and/or data conversion and/or transmission for a variety of different types of electrical data. Connections from a ruggedized connector 20, such as, for example, a MIL-DTL-38999, to the plurality of boards 10 may be accomplished using a flex circuit 30. One end of the flex circuit 30 may be connected to one of the plurality of boards 10 that may be press fit to the pins of the ruggedized connector 20. The other end of the flex circuit 30 may be connected to a plurality of board connectors that connect to the plurality of optoelectronic boards 10 as shown. The flex circuit 30 may act as a backplane enabling power distribution and/or MCU communication between the plurality of boards 10.

As FIG. 1 illustrates, different boards may be used to implement different subsets of functions for a multi-function active optical cable. This may include a wide variety of functions that may be grouped together in many different ways. FIG. 1 is an illustrative embodiment of such an implementation. As shown, Board 1—Power Board 40 may implement power management functions. The power management functions may include, for example: power distribution across the hybrid cable, surge protection, power isolation, noise filtering, and/or voltage regulation. Board 2—Mother Board 50 may implement electrical-optical/optical-electrical conversion of several different data types, including: RS-485, RS-422, RS-232, MIL-STD-1553, and/or ARINC-429. Board 2—Mother Board 50 may also function as a mother board. Board 2—Mother Board 50 may communicate with other boards on the same end of the active optical cable. Also, Board 2—Mother Board 50 may communicate with a mother board on the other end of the active optical cable. In such an embodiment, functions such as, for example: built-in test, health monitoring, self identification, channel rollover, external health reporting, firmware upgrades, and/or temperature compensation may be implemented.

As shown, additional boards may be used to implement additional subsets of functions for the transmission of additional types of data. The illustrated embodiment also shows a Board 3—Interface Board 60 for TTL (transistor-transistor-logic), CMOS, PWM (pulse width modulation), interlock, and/or CAN bus data. Further, Board 4—Interface Board 70 may support 10/100/1000 Base-T electrical Ethernet data. In addition, Board 5—Interface Board 80 may support HD/3G SDI data. Moreover, Board 6—Interface Board 90 may support analog video data. Additional modular boards may support additional electrical data types, including: FireWire, USB, analog sensor, and/or high-speed differential signal data.

Figure 2:
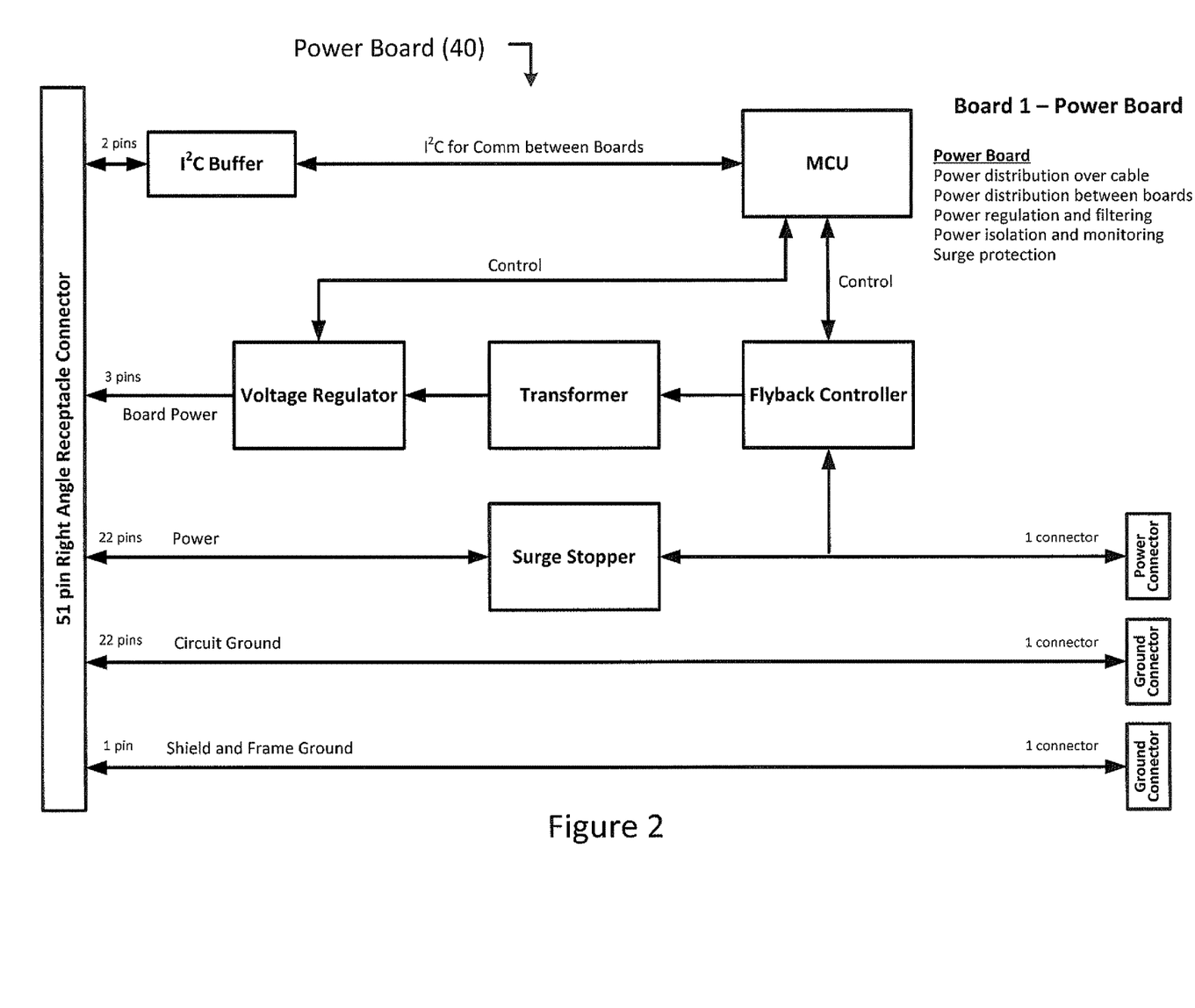
FIG. 2 is a schematic diagram a standardized board for power management that may include power isolation, surge protection, voltage regulation, and/or power distribution in accordance with embodiments disclosed herein.

FIG. 2 illustrates the functional schematic for an embodiment of the power management board, Board 1—Power Board 40. In an embodiment, Board 1—Power Board 40 may be designed to support a wide variety of customer requirements thereby enabling the same board, namely Board 1—Power Board 40, to be used for many different active optical cables that have different power supply voltages and/or power distribution requirements. Board 1—Power Board 40 may also isolate the power supply for the active optical cable boards from the distributed power and/or regulate the incoming power for use by the plurality of optoelectronic boards 10. The Board 1—Power Board 40 may provide power distribution over the cable and/or between the plurality of boards 10. Board 1—Power Board 40 may also provide surge protection, power regulation and/or filtering as well as power isolation and/or monitoring. Board 1—Power Board may provide more than one voltage for use by the plurality of boards 10.

In an embodiment, a 51 pin connector may be used. Two (2) pins may be used for an I$^2$C buffer. The I$^2$C buffer may connect to a MCU 100 to provide communication between the boards 10. Three (3) of the pins may be connected for board power via a voltage regulator. Twenty-two (22) of the pins may be used for power and may connect to a surge stopper. Twenty-two (22) of the pins may be used for circuit ground. One (1) pin may be used for shield and/or frame ground.

Figure 3:
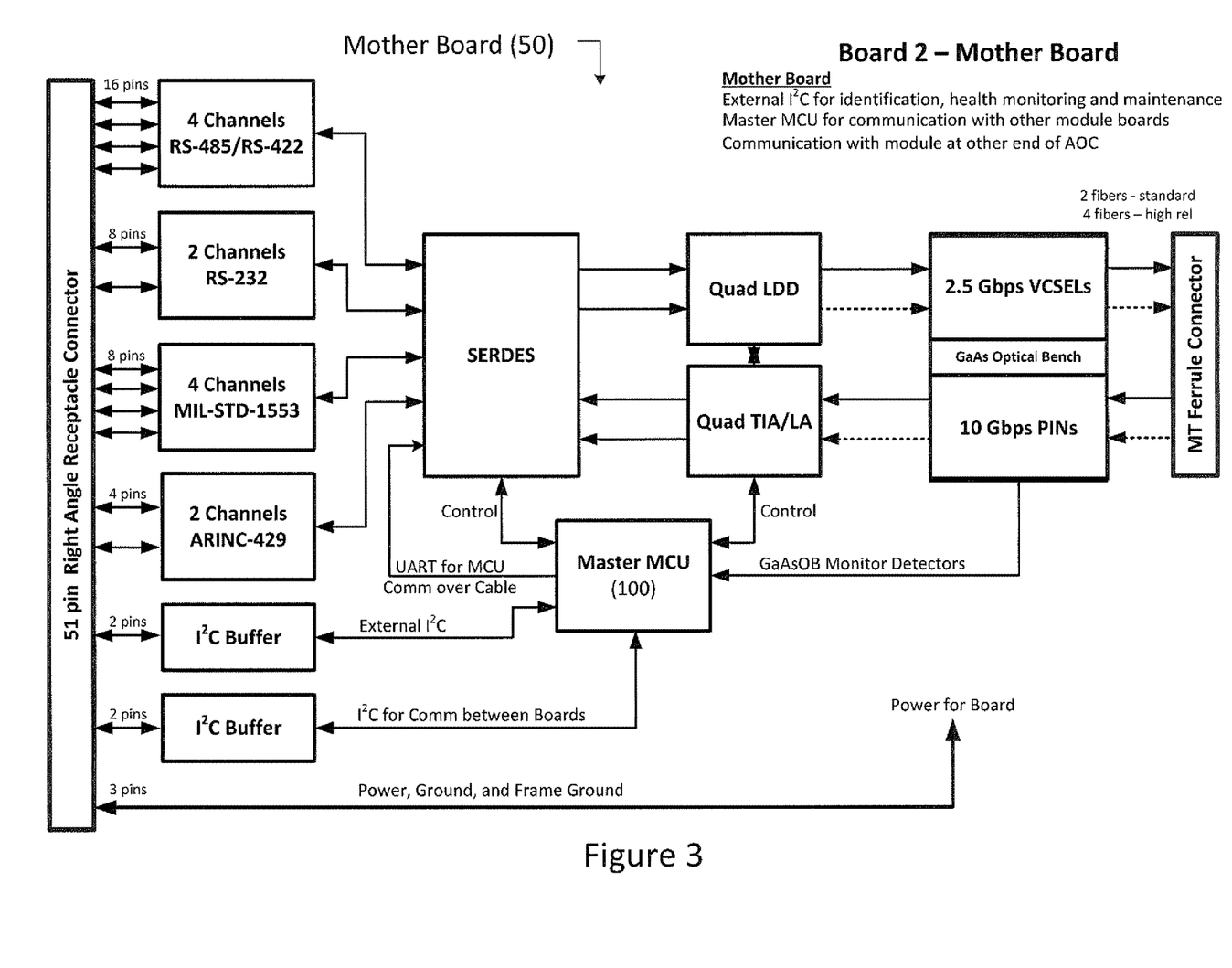
FIG. 3 is a schematic diagram of a standardized board that may include mother board functions including health monitoring and/or control, and electronics and/or optoelectronics for the conversion of several types of electrical data to/from optical data for transmission over the hybrid cable in accordance with embodiments disclosed herein.

FIG. 3 illustrates the functional schematic for an embodiment of the Board 2—Mother Board 50. In an embodiment, Board 2—Mother Board 50 may support the optical transmission of multiple channels of electrical data for each of the electrical interfaces (RS-485/RS-422, RS-232, MIL-STD-1553, and/or ARINC-429). In an embodiment, a 51 pin connector may be used. Sixteen (16) of the pins may be used for four channels of RS-485/RS-422. Eight (8) of the pins may be used for two channels of RS-232. Eight (8) of the pins may be used for four channels of MIL-STD-1553. Four (4) of the pins may be used for two channels of ARINC-429. Two (2) pins may be used for a first I$^2$C buffer. The first I$^2$C buffer may connect to a master MCU 100 to provide communication between the boards 10. Two (2) pins may be used for a second I$^2$C buffer. The second I$^2$C buffer may connect to the master MCU 100 to provide external I$^2$C for identification, health monitoring and/or maintenance. Three (3) pins may be used for connecting power, ground and/or frame ground.

As FIG. 3 also illustrates that low-speed data channels may be multiplexed onto a single optical channel. In addition, FIG. 3 illustrates that back-up channels may be utilized thereby allowing data to be rolled over to the alternative channels in the event that an optical channel may degrade and/or fail. Moreover, FIG. 3 illustrates that the Board 2—Mother Board 50 may have the master MCU 100 that may communicate with other boards on the same end of the active optical cable. The MCU 100 may also communicate with a master MCU on the other end of the active optical cable through a communication channel multiplexed with the other electrical data onto a single optical channel. Obviously, depending on the design of the modular boards and/or the number of data channels, the data may be multiplexed onto more than one optical channel. Multiplexing the data may enable consistent data rates for an optical engine, for example, a laser diode drive, a trans-impedance amplifier, a laser, and/or a photodetector. Multiplexing may also make a modular design easier to implement. However, multiplexing may not necessarily have to be implemented. In addition, while FIG. 3 illustrates an implementation that may only multiplex low-speed (10 Mbps or less) data, the same implementation approach may be used for multiplexing higher speed data if the design requirements favor such an approach.

Figure 4:
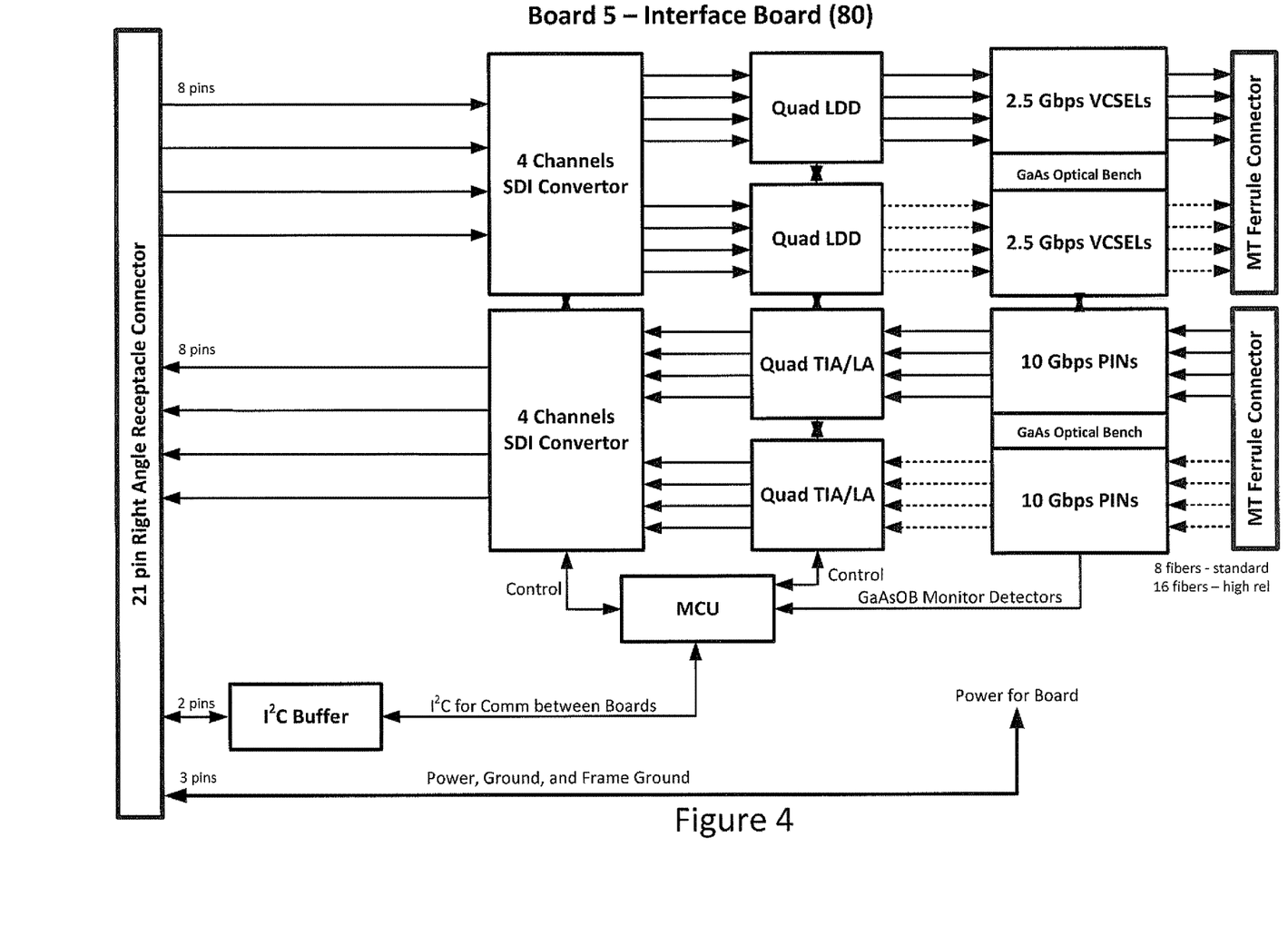
FIG. 4 is a schematic diagram of a standardized daughter board that may include electronics and/or optoelectronics for the conversion of HD-SDI electrical data to/from optical data for transmission over the hybrid cable in accordance with embodiments disclosed herein.

FIG. 4 illustrates the functional schematic for an embodiment of Board 5—Interface Board 80 that may support the optical transmission of multiple channels of SDI video data including standard SDI, HD-SDI, and/or 3G SDI. In an embodiment, a 21 pin connector may be used. Sixteen (16) of the pins may be used for SDI convertors. Two (2) pins may be used for an I²C buffer. The I²C buffer may connect to an MCU to provide communication between the boards 10. Three (3) pins may be used for connecting power, ground and/or frame ground. The higher speed data, for example, 1.5 Gbps or 3 Gbps per channel, may be allocated to an optical channel for every incoming/outgoing electrical channel. Consequently, the electrical data may not require multiplexing. Such an approach may be preferred due to the enhanced ability of achieving robust and/or reliable operation in harsh environments at lower data rates.

While the functionality of each modular board may be different, the boards may all have the same dimensions and/or may utilize similar and/or identical connectors. As previously described with reference to FIG. 1, the boards 10 may be connected to the ruggedized connector 20 by small, low-profile board connectors such as D-Sub and/or nano-miniature connectors. Depending on the requirements of the board 10, the connectors may differ in the number of pins and/or the type of pins used. Such an embodiment may enable different, yet standardized connections for power, low-speed data, and/or high-speed data requiring coaxial connections. On the other side of the board, optical and/or electrical connections to the hybrid cable assembly may be standardized as well. In an embodiment, the optical connections may be made with MT-type connectors. The electrical power connections may be made with a connector, but the preferred connection may be made with a solder cup.

The hybrid cable assembly may include optical fibers and zero or more conductors for transmission of electrical power and/or electrical data. If power distribution over the cable assembly may not be required, then the electrical conductors may be omitted. In an embodiment, the electrical conductors may be shielded with a grounded sheath. The optical fibers may be single and/or multimode fibers. In an embodiment, multimode fibers may be preferred.

Figure 5:
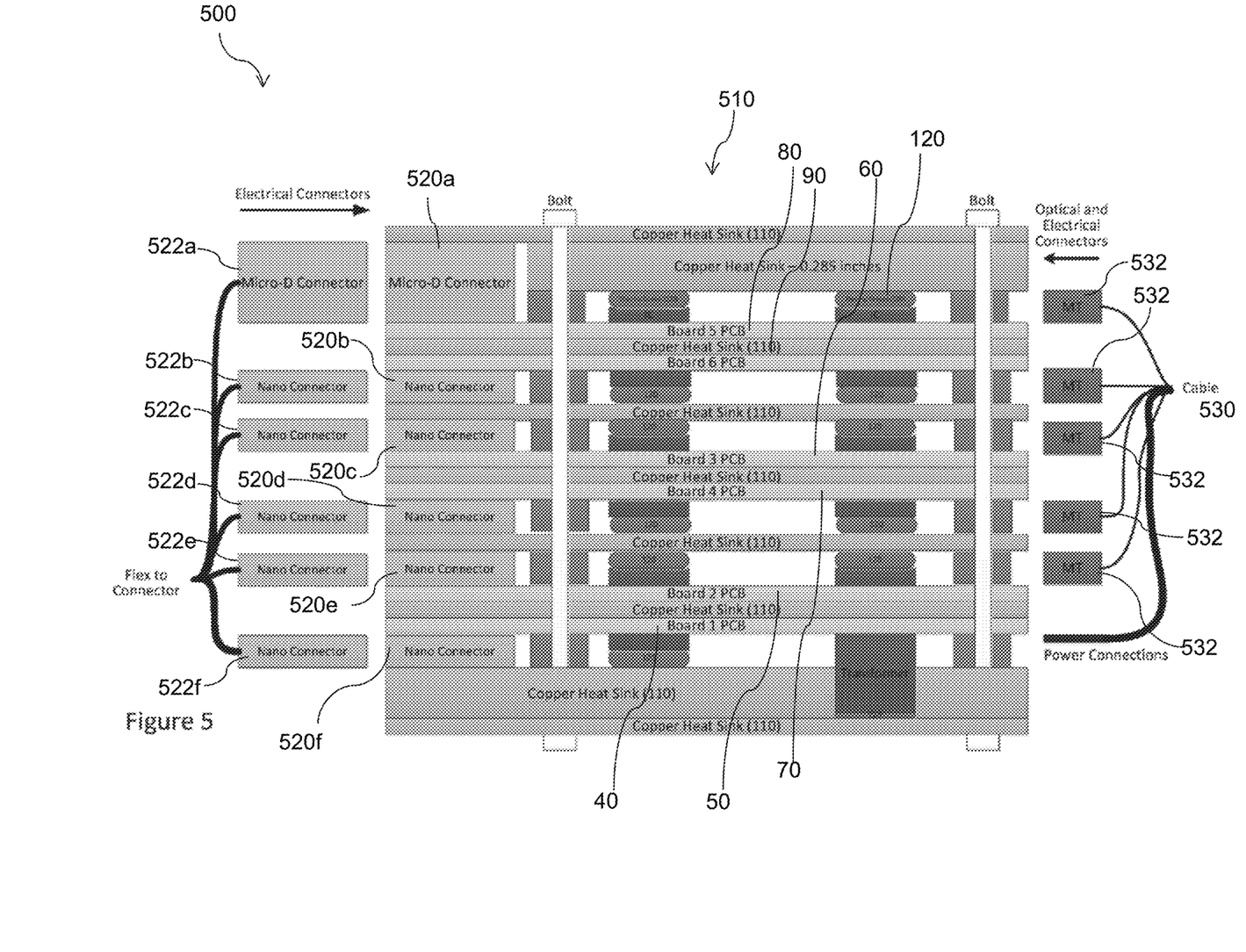
FIG. 5 is a schematic diagram of a stacked assembly of multiple standardized boards for the implementation of a combination of data types in accordance with embodiments disclosed herein. The board stack assembly may include thin heat sink layers that may reduce component junction temperatures and/or enable wider temperature operation, as well as providing mechanical support for mechanical shock and/or vibration. The schematic also shows connectors providing connections from the board to the ruggedized electrical connector and/or hybrid cable.

FIG. 5 is a schematic diagram of a stacked assembly 510 of multiple standardized boards 10 for the implementation of a combination of data types for a modular multi-function active optical cable 500, in accordance with embodiments disclosed herein. The board stack assembly 510 may include thin heat sink layers that may reduce component junction temperatures and/or enable wider temperature operation. The board stack assembly 510 may provide mechanical support for mechanical shock and/or vibration. The schematic diagram also shows connectors 520a-f providing connections from the boards 10 to the ruggedized electrical connector 20 via flex 30 and/or to the hybrid cable 530.

Further, FIG. 5 illustrates an embodiment of a method of assembling multiple modular boards 10 into a ruggedized assembly with integrated heat sinks 110. As shown in FIG. 5, the boards 10 may be assembled between the copper heat sinks 110 with contact on both sides made using thermal grease 120. The method may allow efficient heat sinking and/or spreading, minimizing the temperature rise above ambient for the components on the boards 10. The method may enable higher operating temperatures and/or improved reliability. In addition, the copper heat sinks 110 may provide mechanical support for the boards 10, significantly reducing their susceptibility to mechanical shock and/or vibration. The use of thermal grease 120 between the heat sinks 110 and/or the boards 10 may provide good thermal contact while remaining compliant. The use of the thermal grease 120 may enable the assembly to tolerate extreme temperature cycling despite a mismatch in coefficients of thermal expansion (CTE). To further improve the ruggedization of the assembly, the connectors may be potted with epoxy after the connections have been made.

Using the modular boards 10 may enable the standardized boards 10 to be manufactured in volume even though the boards 10 may be made for different active optical cable requirements. In an embodiment, the boards 10 necessary to implement the required functionality of an active optical cable may be assembled. In an embodiment, the boards 10 may be fully populated even though a particular active optical cable may not require all the channels and/or functions on a board 10. In an embodiment, the board for power management, Board 1—Power Board 40, and/or the mother board, Board 2—Mother Board 50, may be included, although these may obviously be omitted for certain sets of requirements.

Using the flex circuit 30 to connect the ruggedized connector 20 (such as MIL-DTL-38999) to the boards 10 may enable the method to easily accommodate different connector types, pin arrangements, and/or pin-outs by only changing the flex circuit 30 while leaving the configuration of the boards 10 constant. For example, FIG. 5 shows micro-D connectors 522a and nano connectors 522b-f on the flex circuit 30 connecting to the corresponding micro-D connectors 520a and nano connectors 522b-f on the stacked assembly of multiple standardized boards 10. The schematic diagram of FIG. 5 also shows connectors 532 providing connections from the boards 10 to the hybrid cable 530, where the connections are made between a first end 502 of assembly 510 and a second end 504 of assembly 510. For example, MT-type connectors are illustrated. Power connections are also shown.

The method may enable the boards 10 and/or other modular components of the active optical cable to be verified and/or qualified in an active optical cable as modular components that may be reconfigured to meet new customer configurations without significant additional design, verification and/or qualification. Reducing the non-recurring engineering (NRE) costs for a new cable configuration using this method may allow custom active optical cables to be manufactured in small volumes at costs that may not be substantially higher than the costs that may be achieved in the manufacture of high volumes. Such advantages may be possible because the design, verification, and/or qualification of the modular parts may be spread over high volumes consisting of numerous small volume custom configurations.

Figure 6:
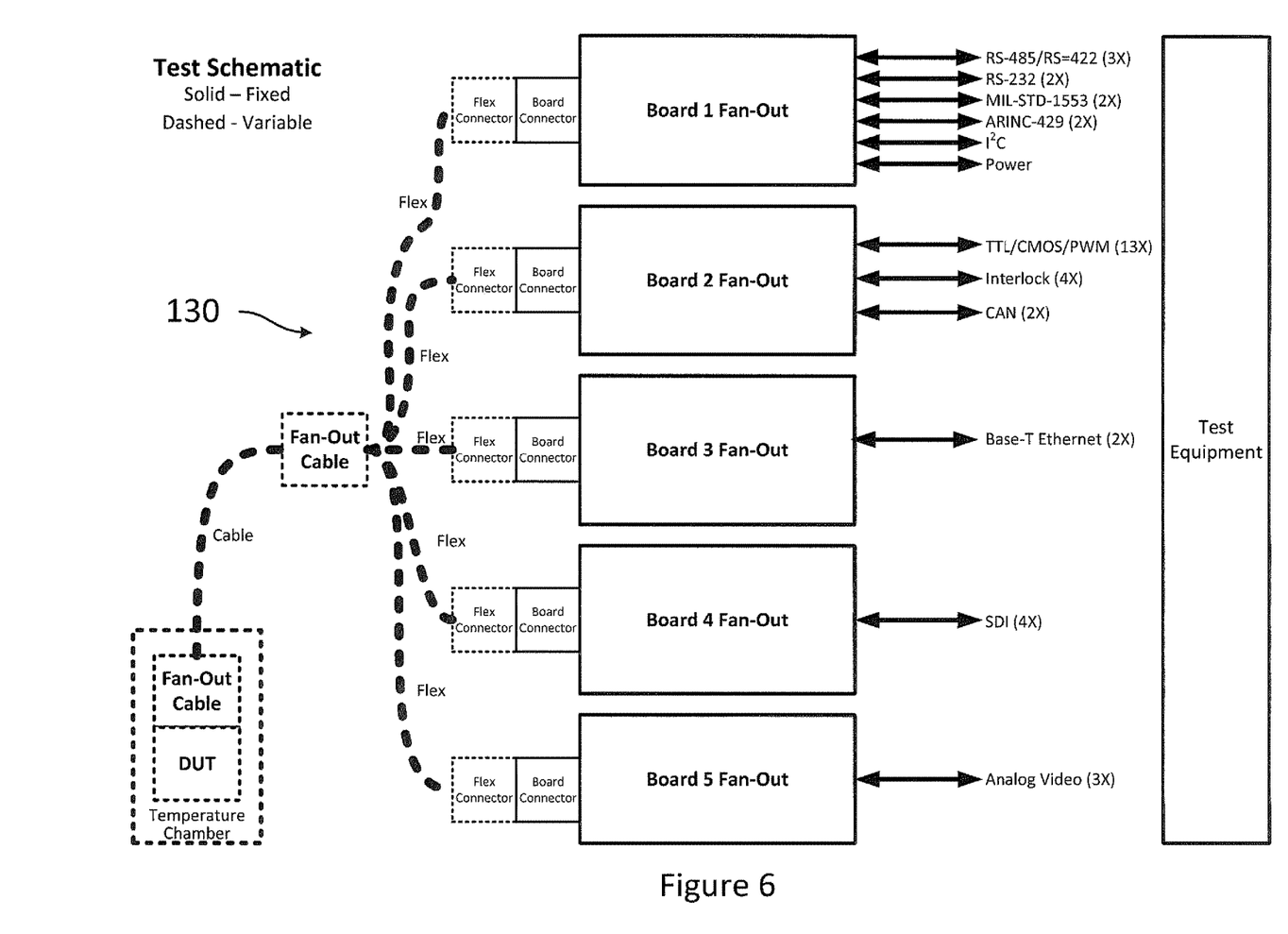
FIG. 6 is a schematic diagram of standardized, modular test equipment that may be configured for testing customized active optical cables with a set-up and/or configuration file in accordance with embodiments disclosed herein.

As FIG. 6 illustrates, a common test set-up 130 may be used for production testing. The test set-up 130 may have a fan-out cable connected via a flex circuit to a flex connector connected to each of the plurality of boards 10. Each flex connector may connect to a corresponding board connector on each of the plurality of boards 10.

The test set-up 130 may have the ability to test all functionality for all channels on each of the plurality of boards 10. The actual test run on a particular active optical cable may be determined by a configuration file that may define which functions and/or data channels may be present. Each of the plurality of boards 10 may have a fan-out for connecting to the test equipment. For example, the fan-out for Board 1—Power Board 40 may allow test equipment to analyze functionality, including: RS-485/RS-422, RS-232, MIL-STD-1553, ARINC-429, $I^2C$ and/or power. The fan-out for Board 2—Mother Board 50 may allow test equipment to analyze functionality, including: RS-485/RS-422, RS-232, MIL-STD-1553, ARINC-429, $I^2C$ and/or power. The fan-out for Board 3—Interface Board 60 may allow test equipment to analyze functionality, including: TTL (transistor-transistor-logic), CMOS, PWM (pulse width modulation), interlock, and/or CAN bus data. The fan-out for Board 4—Interface Board 70 may allow test equipment to analyze functionality, including: 10/100/1000 Base-T electrical Ethernet data. The fan-out for Board 5—Interface Board 80 may allow test equipment to analyze HD/3G SDI data. The fan-out for Board 6—Interface Board 90 may allow test equipment to analyze analog video data.

Thus, the test set-up 130 may have the ability to test all functionality for all channels on each of the plurality of boards 10, but the actual test run on a particular active optical cable may be determined by a configuration file that may define which functions and/or data channels may be present. A similar configuration file may be used to set-up the firmware during manufacturing, enabling a single version of the firmware to be developed that may include all functions, but may be configured to only implement those present in a particular active optical cable.

It should be understood that various changes and/or modifications to the presently preferred embodiments described herein will be apparent to those skilled in the art. Such changes and/or modifications may be made without departing from the spirit and/or scope of the present invention and without diminishing its attendant advantages. It is, therefore, intended that such changes and/or modifications be covered by the appended claims.

The invention claimed is:

1. A method of making a modular multi-function active optical cable, the method comprising:
assembling at least a first modular board, a second modular board, and a third modular board to form an assembly, wherein the first modular board includes at least a first connector located at a first end of the assembly, the second modular board includes at least a second connector located at the first end, and the third modular board includes at least a third connector located at the first end, and wherein the first modular board comprises a power board implementing power management functions, the second modular board comprises a mother board implementing electrical-optical/optical electrical conversions, and the third modular board comprises at least one interface board configured to perform functions for transmission of additional types of data;

connecting a first end of an electrical connector to the assembly at the first end of the assembly, wherein connecting comprises using an interface to connect the first end of the electrical connector to the at least first connector, the at least second connector, and the at least third connector, wherein the electrical connector comprises a ruggedized connector connected at a second end of the electrical connector opposite the first end of the electrical connector; providing a flex circuit between the ruggedized connector and each of the at least first connector, the at least second connector, and the at least third connector of the first modular board, the second modular board, and the third modular board, respectively; and connecting a hybrid cable assembly to the assembly at a second end of the assembly opposite the first end such that the electrical connector and the hybrid cable assembly are connected at opposite ends of the assembly, wherein the hybrid cable assembly includes one or more optical fibers and one or more electrical conductors, the hybrid cable assembly being connected to the assembly (i) between the the second modular board and the third modular board, and (ii) above the third modular board.

2. The method of claim 1, wherein:
the first modular board, the second modular board, and the third modular board are configured to accommodate at least one of: one or more first connector types, one or more electrical connector types, one or more pin arrangements, one or more pin-outs, or one or more connector sizes without changing the first modular board, the second modular board, or the third modular board;
the electrical connector and the hybrid cable assembly are directly physically connected to the assembly; and
the third modular board is located above the first modular board and the second modular board.

3. The method of claim 1, wherein assembling includes:
using one or more fixed first connector types for at least one of the first modular board, the second modular board, or the third modular board.

4. The method of claim 1 wherein the at least first connector, the at least second connector, and the at least third connector include a coaxial connection, a direct solder connection, a D-sub type connector, a nanominiature type connector, a cable-to-board connector, or a board mount connector.

5. The method of claim 1, wherein using the interface to connect the first end of the electrical connector to each of the at least first connector of the first modular board, the at least second connector of the second modular board, and the at least third connector of the third modular board includes:
changing the interface between the first end of the electrical connector and the at least first connector, the at least second connector, and the at least third connector to accommodate different pin-outs in the electrical connector.

6. The method of claim 1, further comprising:
press-fitting or soldering a board to pins of the electrical connector in the interface between the electrical connector and the at least first connector of the first modular board, the at least second connector of the second modular board, and the at least third connector of the third modular board.

7. The method of claim 6, further comprising:
surface mounting the at least first connector, the at least second connector, and the at least third connector to the first modular board, the second modular board, and the third modular board, respectively, that press-fits or solders to the pins of the electrical connector.

8. The method of claim 6, further comprising:
connecting the first modular board, the second modular board, and the third modular board to the at least first connector, the at least second connector, and the at least third connector, respectively, with the flex circuit.

9. The method of claim 1, further comprising:
providing the flex circuit in the interface between the first end of the electrical connector and the at least first connector of the first modular board, the at least second connector of the second modular board, and the at least third connector of the third modular board.

10. The method of claim 1, wherein the assembly forms an enclosure comprising the first modular board, the second modular board, and the third modular board, the method further comprises:
connecting the enclosure for the first modular board, the second modular board, and the third modular board to frame ground.

11. The method of claim 1, further comprising:
providing power connections, ground connections, interconnections, or microcontroller communication between the first modular board, the second modular board, and the third modular board independent of a connection to a pin on the electrical connector in the interface between the electrical connector and the at least first connector of the first modular board, the at least second connector of the second modular board, and the at least third connector of the third modular board.

12. The method of claim 1, further comprising:
connecting the electrical connector to frame ground.

13. The method of claim 1, wherein connecting the electrical connector further comprises:
separating power and ground connections associated with the electrical connector from other signal connections associated with the electrical connector in the interface.

14. The method of claim 1, further comprising:
enabling one or more of the first modular board, the second modular board, and the third modular board to be used in different combinations to implement different active optical cable requirements.

15. The method of claim 1, further comprising:
providing a fixed optical interface to the hybrid cable assembly and a fixed electrical interface to the hybrid cable assembly for at least one of the first modular board, the second modular board, or the third modular board.

16. The method of claim 1, further comprising:
implementing subsets of total functionalities available in the modular multi-function active optical cable.

17. The method of claim 1, further comprising:
providing a mechanism to communicate between the first modular board, the second modular board, and the third modular board.

18. The method of claim 1, further comprising:
providing microcontrollers to communicate between the at least first modular board, the second modular board, and the third modular board, wherein the microcontrollers include a master microcontroller and slave microcontrollers.

19. The method of claim 1, further comprising:
communicating from the first modular board, the second modular board, and the third modular board at the first end of the active optical cable over the hybrid cable assembly to the first modular board, the second modular board, and the third modular board at the second end of the active optical cable.

20. The method of claim 1, further comprising:
implementing, at one or more of the first modular board, the second modular board, or the third modular board, power management functions for other modular boards, wherein the power management functions comprise power distribution over the hybrid cable assembly, surge protection, power isolation, voltage regulation, noise filtering, or providing one or more voltages to the other modular boards.

21. The method of claim 20, further comprising:
connecting shield grounds to a frame ground.

22. The method of claim 1, wherein the first modular board comprising the power board is further configured to implement common functions for other modular boards, wherein the common functions comprise communication outside the active optical cable, built-in test, health monitoring, status reporting, or communication with the other end of the active optical cable.

23. The method of claim 22, wherein the common functions comprise providing an interface for field maintenance, an interface for firmware upgrades, or an interface for communicating with upstream components and systems.

24. The method of claim 22, further comprising:
implementing, at the mother board, other functions that are not the common functions.

25. The method of claim 1, further comprising:
implementing communication using a two wire interface, I2C, three wire interface, SPI, multi-wire interface, RS-422, or Ethernet independent of the active optical cable.

26. The method of claim 1, further comprising:
implementing optical communication from the first end of the active optical cable to the second end of the active optical cable.

27. The method of claim 1, further comprising:
implementing the interface to receive one or more electrical data types with the first modular board, the second modular board, and the third modular board; and
converting incoming or outgoing electrical data of the one or more electrical data types to or from optical data for transmission over the hybrid cable assembly.

28. The method of claim 27, further comprising:
providing more than one channel of a specific one of the one or more electrical data types.

29. The method of claim 27, further comprising:
accommodating RS-485, RS-422, RS-232, MIL-STD-1553, ARINC-429, CAN Bus, transistor-transistor logic (TTL), CMOS type data, pulse width modulated (PWM) type data, interlock type data, 10/100/1000 Base-T Ethernet, analog video data, SDI video, CameraLink, FireWire, USB, high-speed differential signal data, or DVI video data in the interface for the one or more electrical data types.

30. The method of claim 27 further comprising:
using health monitoring to enable the optical data to be rolled over to an alternative optical channel if a primary optical channel degrades or fails.

31. The method of claim 1, further comprising:
enabling one of the first modular board, the second modular board, or the third modular board to be used in the active optical cable, wherein one or more functions implemented on the enabled modular board are not active.

32. The method of claim 1, further comprising:
performing verification and qualification of the first modular board, the second modular board, and the third modular board; and
applying the verification and qualification to different active optical cables.

33. The method of claim 1, further comprising:
using a common set of firmware with a configuration file to specify functions present in the active optical cable.

34. The method of claim 1, further comprising:
using a common set of test equipment and procedures with a configuration file to specify functions present in the active optical cable.

35. The method of claim 1, further comprising:
providing at least one mechanical support to the assembly for reducing at least one of: mechanical shock or vibration, wherein the at least one mechanical support is located adjacent to at least one of the first modular board, the second modular board, or the third modular board.

36. The method of claim 1, further comprising:
bolting, screwing, or clipping the assembly of the first modular board, the second modular board, and the third modular board together.

37. The method of claim 1, further comprising:
providing heat sinks for the assembly for the first modular board, the second modular board, and the third modular board.

38. The method of claim 37, further comprising:
attaching the heat sinks to the first modular board, the second modular board, and the third modular board using a compliant material to compensate for differences in coefficients of thermal expansion or thermally conductive epoxy.

39. The method of claim 37, further comprising:
connecting the heat sinks to frame ground.

40. The method of claim 37 further comprising:
attaching the heat sinks to front sides and back sides of the first modular board, the second modular board, and the third modular board.

41. The method of claim 1, wherein connecting the hybrid cable assembly includes:
providing modular hybrid cable assemblies to meet requirements of different users, wherein the modular hybrid cable assemblies are provided to include optical fibers or electric conductors, the optical fibers or the electrical conductors included in the modular cable assemblies being selectable for the different users.

42. The method of claim 1, further comprising:
providing the hybrid cable assembly to support distribution of power at different voltages, currents or distances.

43. The method of claim 1, further comprising:
terminating the one or more optical fibers of the hybrid cable assembly using at least one of one or more media type (MT) type connectors, one or more MT ferrules, and one or more local connector (LC) ferrules.

44. The method of claim 1, further comprising:
shielding the one or more electrical conductors with at least one of a grounded conductive sheath or other ground shield.

45. The method of claim 1, further comprising:
ruggedizing the hybrid cable assembly with a strength member.

46. The method of claim 45, wherein connecting the hybrid cable assembly further comprises:
connecting, using the strength member, the hybrid cable assembly to at least one of: the first modular board, the second modular board, the third modular board, a first frame for the first modular board, a second frame for the second modular board, a third frame for the third modular board, or the electrical connector.

47. The method of claim 1, further comprising:
providing jacketing material to the hybrid cable assembly to provide environmental ruggedization.

48. The method of claim 1, wherein the assembly forms an enclosure comprising the first modular board, the second modular board, and the third modular board, the method further comprises:
using the enclosure to mechanically connect the first modular board, the second modular board, and the third modular board to the electrical connector and the hybrid cable assembly.

49. The method of claim 1, further comprising:
providing at least one of environmental sealing, mechanical ruggedization, strain relief, and electromagnetic interference (EMI) shielding with an enclosure for the first modular board, the second modular board, and the third modular board.

50. The method of claim 1, wherein:
the assembly forms an enclosure comprising the first modular board, the second modular board, and the third modular board; and
the enclosure comprises at least one of overmolding or a backshell.

51. The method of claim 1, wherein the assembly forms an enclosure comprising the first modular board, the second modular board, and the third modular board, the method further comprises:
enabling the enclosure to be used for a variety of combinations of the first modular board, the second modular board, and the third modular board.

52. The method of claim 1, wherein the assembly forms an enclosure comprising the first modular board, the second modular board, and the third modular board, the method further comprises:
enabling straight, right-angle, or arbitrary-angle connections by modifying the enclosure and connections to the electrical connector.

53. The method of claim 1, wherein the hybrid cable assembly includes one or more additional connectors for the one or more optical fibers, and electrical conductor terminations for connection to the first modular board, the second modular board, and the third modular board, wherein the hybrid cable assembly directly connects to the first modular board, the second modular board, and the third modular board via the one or more additional connectors.

54. The method of claim 1, further comprising:
filling a space between the first modular board and the second modular board with a thermally conductive foam or injection molded material; and
filling (i) a space between the third modular board and a fourth modular board or (ii) at least a portion of a space between the third modular board and a heat sink, with the thermally conductive foam or the injection molded material.

55. The method of claim 1, further comprising:
providing one or more heat sinks for the assembly to couple to the first modular board, the second modular board, and the third modular board; and
providing a flex circuit between the ruggedized connector of the electrical connector and each of the at least first connector, the at least second connector, and the at least third connector of the first modular board, the second modular board, and the third modular board, respectively.

56. The method of claim 1, wherein the hybrid cable assembly further comprises at least one power connection, the method further comprising:
connecting the at least one power connection at a location between the first modular board and a first copper heat sink, wherein the power board is located adjacent to the first copper heat sink.

57. A method of making a modular multi-function active optical cable, the method comprising:
assembling at least a first modular board, a second modular board, and a third modular board to form an assembly, wherein the first modular board includes at least a first connector located at a first end of the assembly, the second modular board includes at least a second connector located at the first end, and the third modular board includes at least a third connector located at the first end, and wherein the first modular board comprises a power board implementing power management functions, the second modular board comprises a mother board implementing electrical-optical/optical electrical conversions, and the third modular board comprises at least one interface board configured to perform functions for transmission of additional types of data;
providing one or more heat sinks for the assembly to couple to the first modular board, the second modular board, and the third modular board;
connecting a first end of an electrical connector to the assembly at the first end of the assembly, wherein connecting comprises using an interface to connect the first end of the electrical connector to the at least first connector, the at least second connector, and the at least third connector, wherein the electrical connector comprises a ruggedized connector connected at a second end of the electrical connector opposite the first end of the electrical connector;
providing a flex circuit between the ruggedized connector of the electrical connector and each of the at least first connector, the at least second connector, and the at least third connector of the first modular board, the second modular board, and the third modular board, respectively; and
connecting a hybrid cable assembly to the assembly at a second end of the assembly opposite the first end such that the electrical connector and the hybrid cable assembly are connected at opposite ends of the assembly, wherein the hybrid cable assembly includes one or more optical fibers and one or more electrical conductors, the hybrid cable assembly being connected to the assembly (i) between the second modular board and the third modular board, and (ii) above the third modular board.

* * * * *